United States Patent [19]

Godfrey et al.

[11] 4,443,831

[45] Apr. 17, 1984

[54] LIGHT MEANS AND METHOD OF LIGHTING

[76] Inventors: Timothy D. Godfrey; Rodger L. Smith, both of P.O. Box 605, Wichita, Kans. 67201

[21] Appl. No.: 492,900

[22] Filed: May 9, 1983

[51] Int. Cl.³ .............................................. B60Q 1/00
[52] U.S. Cl. ...................................... 362/80; 362/135; 362/140; 362/141; 362/142; 362/184; 362/190; 362/191; 362/198; 362/200; 362/249; 362/250; 362/251; 362/269; 362/275; 362/285; 362/287; 362/293; 362/295; 362/368
[58] Field of Search ................. 362/80, 135, 140, 141, 362/142, 184, 190, 191, 198, 200, 249, 250, 251, 295, 269, 275, 285, 287, 293, 368

[56] References Cited

U.S. PATENT DOCUMENTS

| 2,012,593 | 8/1935 | Strong | 362/80 |
| 3,307,026 | 2/1967 | Kramer | 362/191 |

Primary Examiner—Stephen J. Lechert, Jr.
Attorney, Agent, or Firm—John H. Widdoswon

[57] ABSTRACT

A portable auxiliary light having a case, a battery positioned within the case, and a light house on the end of the case. The light also has bellows interattaching the case and the light house and a related circuitry positioned in the case. The method for lighting includes locating the light behind a rear view mirror such that a recess in the case straddles the support post of the rear view mirror, and securing the light to the mirror. A switch on the case is activated to furnish lighting to the inside of the automobile.

9 Claims, 10 Drawing Figures

LIGHT MEANS AND METHOD OF LIGHTING

BACKGROUND OF THE INVENTION

1. Field of the Invention

This invention provides a portable dual auxiliary lighting means for lighting the inside of an automobile, or the like.

2. Description of the Prior Art

U.S. Pat. No. 2,012,593 by Strong relates to an inside lamp for automobiles. The lamp may be readily shifted into position to direct light on reading matter held by an occupant of the front seat or to direct light on the face of an occupant employing the rear view mirror as a make-up mirror. U.S. Pat. No. 2,466,454 by Logan discloses an illuminated automobile sun visor mirror. U.S. Pat. No. 4,227,241 by Morcus teaches a visor assembly having a built-in lighted vanity mirror. None of the foregoing prior art teach or suggest the particular lighting means and method for lighting of this invention.

SUMMARY OF THE INVENTION

This invention accomplishes its desired objects by providing a portable dual auxiliary lighting means generally mounted behind the inside interior rear view mirror having a support post. The lighting means includes a case means; a plurality of battery means situated within the case means; and a pair of light housings for securing and housing a pair of light bulbs. A pair of bellows means interattaches each of the light housings to the case means and a related circuitry means housed within the case means engages the battery to each of the light bulbs. A fastener means is positioned on the case means for securing the lighting means behind the rear view mirror. The method for lighting the inside of an automobile includes locating the lighting means behind the interior rear view mirror of the automobile, and positioning the lighting means such that the recess straddles the support post of the rear view mirror. The lighting means is secured to the mirror and a switch on the case means is activated to furnish lighting to the inside of the automobile.

It is an object of the invention to provide a novel lighting means and method for lighting.

Still further objects of the invention reside in the provision of a lighting means which can be easily assembled and connected to a rear view mirror, and is relatively inexpensive to manufacture.

These together with the various ancillary objects and features will become apparent as the following description proceeds, are attained by this invention, preferred embodiments being shown in the accompanying drawings, by way of example only, wherein:

DETAILED DESCRIPTION OF THE INVENTION

Figure 4:
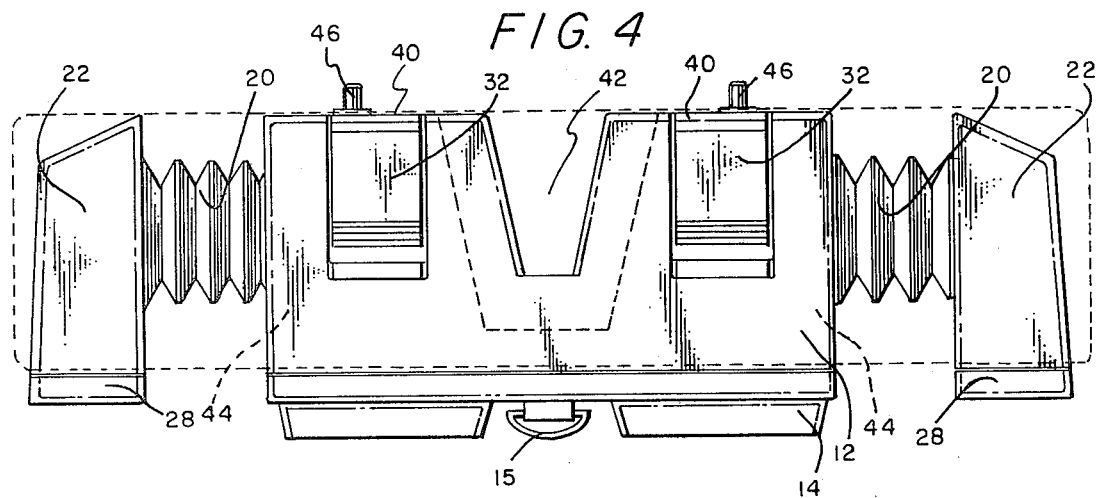
FIG. 4 is a rear elevational view of the invention with the light housings extended outwardly.
Figure 7:
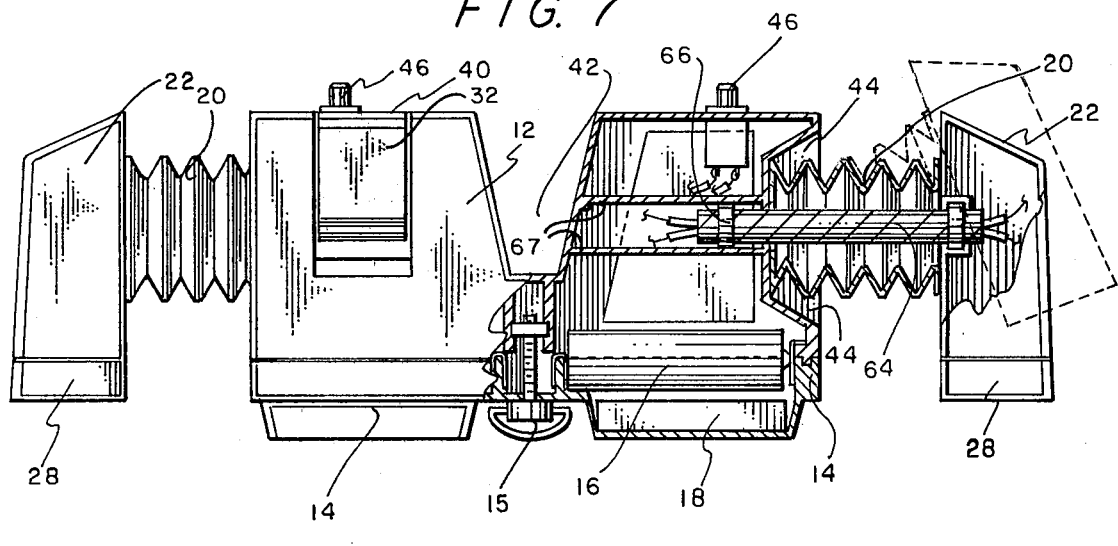
FIG. 7 is a partial vertical sectional view taken in direction of the arrows and along the plane of line 7—7 in FIG. 5.
Figure 8:
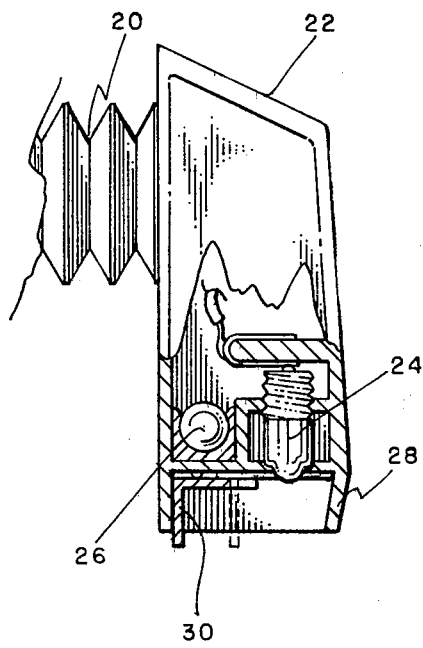
FIG. 8 is a partial exploded front elevational view of a light housing having a light bulb and a lens housing.
Figure 10:
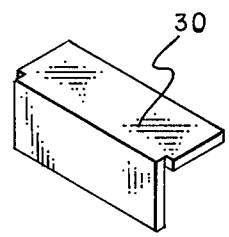
FIG. 10 is a perspective view of a lens-filter that is slideably mounted in a lens housing.
Figure 9:
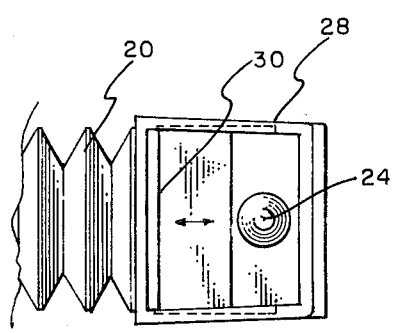
FIG. 9 is an enlarged bottom plan view of a light housing disclosing a light bulb and the lens-filter.

Referring in detail now to the drawings, wherein like reference numerals designate similar parts of the invention throughout the various views, there is seen a portable dual auxiliary light, generally illustrated as 10, having a main case 12 and a battery-magnetic housing 14 connected to said case 12 by D-ring 15 for housing and holding batteries 16 and magnets 18. Bellows 20—20 (or boots) attach light housings 22—22 to the ends of the case 12 as illustrated in FIGS. 4 and 7. Light housings 22—22 house and secure a pair of light bulbs 24—24 and replacement light bulbs 26—26 (see FIG. 8). A pair of lens housing 28—28 respectively connect to each of the light housings 28—28, and includes lens-filter 30—30 (see FIG. 10) slidably lodged therein such as to be slidably positioned over each of the light bulbs 24—24 to prevent unwanted light from escaping around the edges of the lens housing 28 and being observed by someone other than the user of the light.

Figure 5:
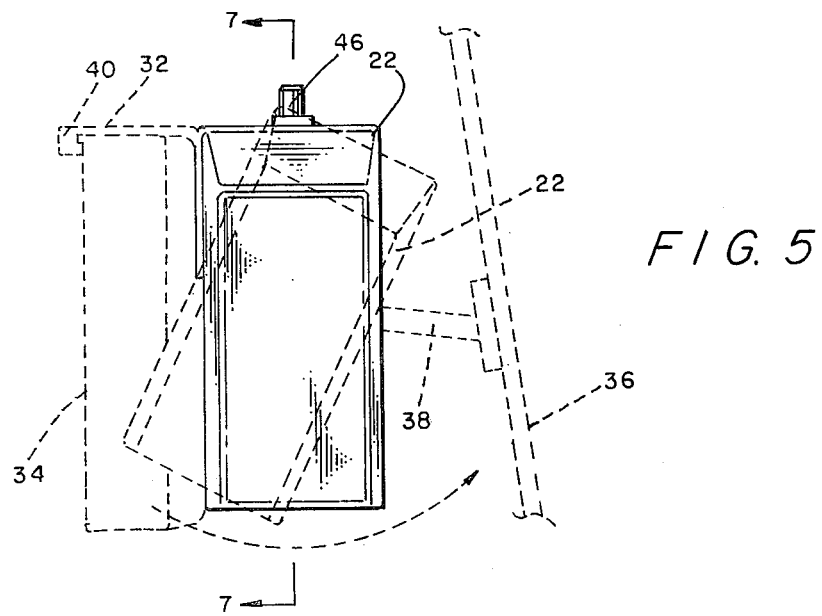
FIG. 5 is an end view of the invention positioned with a rear view mirror, the support post of the rear view mirror, and a windshield of an automobile, or the like, represented by dotted lines.

Spring biased clips 32—32 are positioned on the main case 12 for clamping (see FIG. 5) over the top of a rear view mirror 34, interconnected to windshield 36 of an automobile (not shown in the drawings), or the like, by a support post 38, in order to hold the lights 10 against the back of the mirror 34, as illustrated in FIG. 5. The clips 32—32 each contain a torsion spring (not shown in the drawings) with sufficient strength to cause the clips 32—32 to be forced into a closed position the mirror side of the main case 12. The clips 32—32 can be lifted away from the main case 12 and raised to approximately 100 degrees to allow the clips 32—32 sufficient height to clear the top of the edge of the mirror 34, but not enough to prevent the clips 32—32 to extend too far and cause the light 10 to fall from its position behind the mirror 34. The end 40 of each clip 32 is bent to form a right angle (see FIG. 5), and then bent inward toward the front of the mirror 34 so that the edge fastens under the top of the mirror 34. Clips 32—32 may also serve to hold the light 10 to objects other than the mirror 34, such as a belt, rope, line, pocket, vehicle visor or window, ledge, book, etc.

Figure 1:
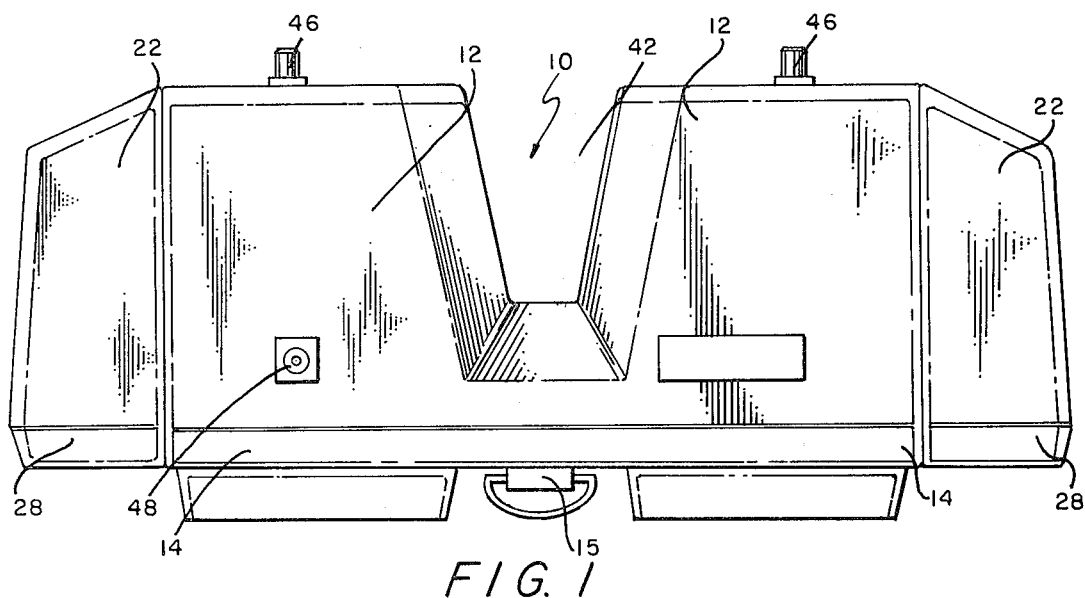
FIG. 1 is a front, elevational view of the invention.
Figure 2:
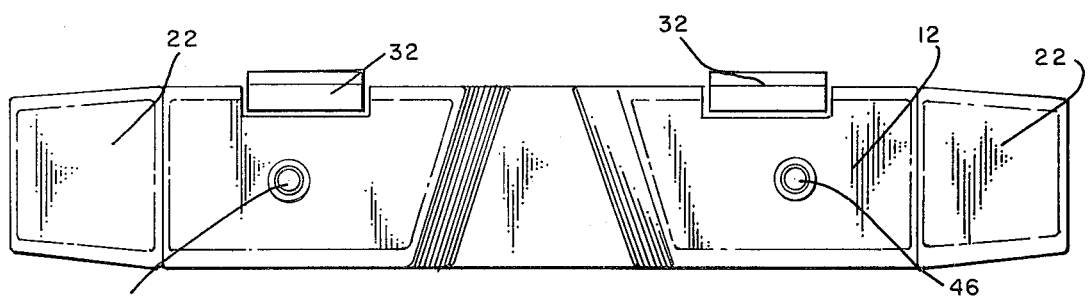
FIG. 2 is a top plan view of the invention.
Figure 3:
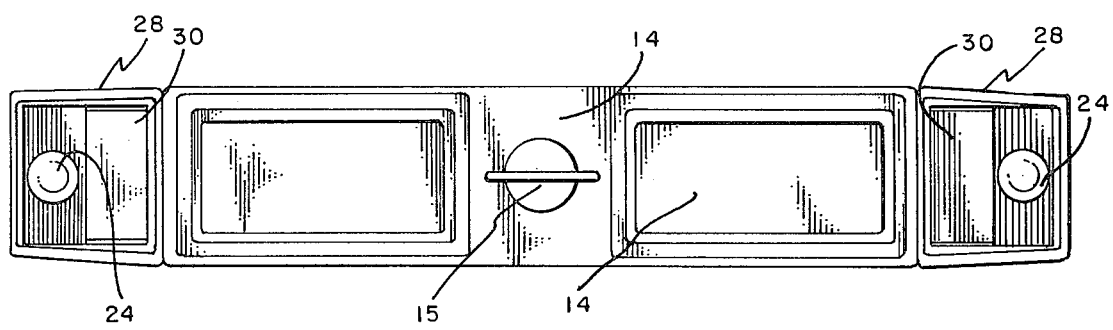
FIG. 3 is a bottom plan view of the invention.

Case 12 has a recess 42 for straddling the support post 38 (see FIG. 5) while the spring biased clips 32—32 are situated over the top of the rear view mirror 34. Case 12 also has a pair of internal depressions 44—44 (or recesses) on each side of its ends to capture each of the bellows 20—20 when the same are depressed or in a collapsed position as illustrated in FIGS. 1-3. Switches 46—46 and recharge plug 48 are mounted on top and side of the main case 12, respectively, and are part of a related circuitry (see FIG. 6), generally illustrated as 50, which electrically engages the battery 16—16 to each of the light bulbs 24—24.

Circuitry 50 (see FIG. 6) contains two autonomous or independent lighting systems, each comprised of a switch 46, a light bulb 24, a battery 16, and diodes 52—52 (IN 4001) in series between switch 46 and light bulb 24 in order to drop the voltage so that the light bulbs 24—24 at their designed voltage ratings, which in a preferred embodiment of the invention is 2.25 v. The related circuitry 50 is constructed such that the batteries 16—16 of both independent lighting systems can be recharged through recharge plug 48 which may receive a dc input voltage of between about 7 to 35 volts. The input voltage is applied to a 7805 chip 54 where it is dropped down to approximately 5 v. The reduced 5 v voltage passes through diode 56 (IN 4001) where it is dropped further down to 4.3 v. The reduced 5 v voltage also passes through a resistor 58 (ohms) and an indicator light 60 as a monitoring circuit to monitor the power potentials of batteries 16—16. As the charge to batteries 16—16 increases, the intensity of indicator light 60 increases. Likewise as the power potentials of batteries 16—16 decrease through usage, the intensity of indicator light 60 decreases. Diodes 62—62 (IN 4001) drop the voltage further to the proper charging potential for the batteries 16—16 which may vary depending on the size of batteries 16—16.

Figure 6:
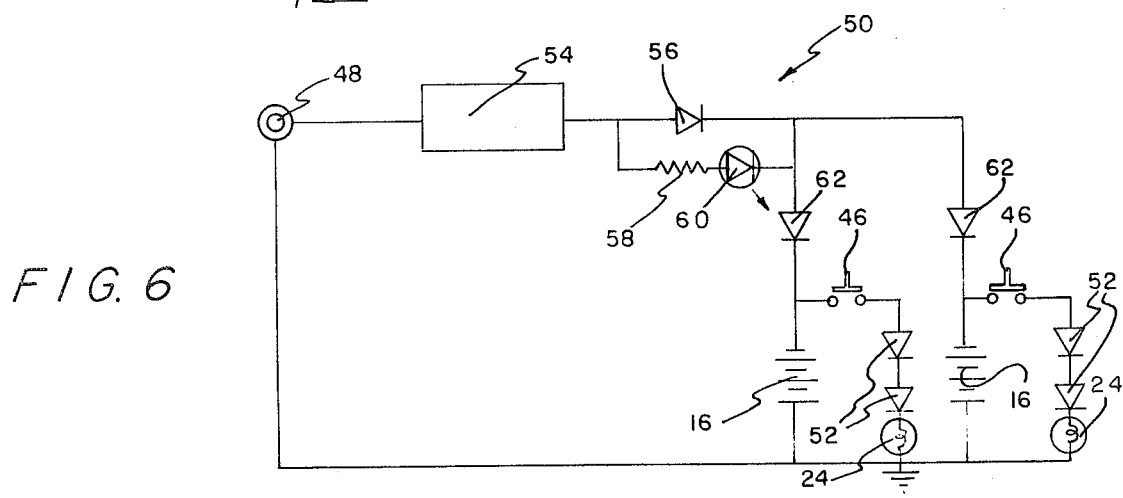
FIG. 6 is a schematic diagram of the dual auxiliary light system circuitry.

Circuitry 50 also comprises a pair of flexible cables 64—64, not shown in FIG. 6 but illustrated in FIG. 7. Each flexible cable 64—64 is partly housed or encased by bellows 20—20 while having an end 66 slidably lodged on ribs 67—67 (or sleeve) within the case 12 (as shown in FIG. 7). Bellows 20—20 covers the flexible cables 64—64 and connects the main case 12 with the light housings 22—22 and provides a means of shielding the flexible cables 64—64 and the wiring inside from the atmospheric elements and helps resist moisture that might enter either the main case 12 or the light housings 22—22 via openings in housings 22—22 where the cables 64—64 pass. Each end of the bellows 20—20 fits tightly into the main case 12 and the light housings 22—22; however, the light housings 22—22 are loose enough to permit them to be rotated 360 degrees without twisting the bellows 20—20.

With continuing reference to the drawings for operation of the invention and the method for lighting or illuminating the inside of an automobile, or the like, the portable dual auxiliary light 10 is located behind interior rear view mirror 34 of the automobile, or the like, and positioned such that the recess 42 straddles the support post 38. Spring biased clips 32—32 are pulled out and positioned over the top of the mirror 34 to secure the light 10 to the back of same. Either or both switches 46—46 may be pushed down to close one or both of the independent or autonomous battery circuits to light one or both light bulbs 24—24 to furnish illumination or lighting to the inside of the automobile. After either or both of light bulbs 24—24 are lit, the respective light housing 22 or housings 22—22 may be withdrawn from depression 44 or depressions 44—44 manipulated in any predetermined direction in order to channel the light to a desired location. When the power of batteries 16—16 is low, the light 10 may be recharged through recharge plus 48 as has been previously described.

Light 10 is designed to allow it to be removed from the back of the mirror 34 and utilized elsewhere, such as for changing a tire in the dark, or a passenger looking for something in the back seat or in the glove compartment. The magnets 18—18 are strong enough to allow the light 10 to be attached to an object (fender or hood of a vehicle) at any angle from 0 degrees to 180 degrees which would be upside down.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A portable dual auxiliary lighting means generally mounted behind the inside interior rear view mirror with a support post of an automobile, or the like, comprising a case means;

battery means situated within said case means;
    a pair of light housing for securing and housing a pair of light bulb;
    adjustably positionable means interattaching said light housing to said case means;
    a related circuitry means engaging said battery means to said light bulb, said circuitry being substantially housed within said case means and including at least one switch for closing the related circuitry between said battery means and said light bulb;
    and a fastener means positioned on said case means for securing the lighting means behind said rear view mirror, said battery means is a plurality of same, said adjustably positionable means is bellows with one of same for each of said light housings; a related circuitry means engaging the battery means to each of the light bulbs; and said fastening means comprises at least one spring biased clip means situated on said case means for clamping over the top of the rear view mirror to hold the lighting means against the back of the mirror.

2. The portable dual auxiliary lighting means of claim 1 additionally comprising a magnetic means positioned within said case means.

3. The portable dual auxiliary lighting means of claim 2 wherein said case means defines a recess for straddling the support post while said spring biased clip is situated over the top of said rear view mirror.

4. The portable dual auxiliary lighting means of claim 3 additionally comprising a lens housing connected to each of said light housings, a lens-filter slidably lodged in each of said lens housing such as to be slidably positioned over each of the light bulbs.

5. The portable dual auxiliary lighting means of claim 4 wherein said pair of light housings and the attached pair of lens housing is oppositely positioned with respect to each other on the ends of the case means.

6. The portable dual auxiliary lighting means of claim 5 wherein said case means additionally defines an internal depression on each of its ends to capture each of said bellows means when the same are in a collapsed position.

7. The portable dual auxiliary lighting means of claim 6 wherein said related circuitry comprises a pair of flexible cable means, each of said flexible cable means being partly housed by one of the bellows means while having an end slidably lodged within said case means.

8. The portable dual auxiliary lighting means of claim 7 additionally comprising a battery-magnetic housing connected to said case means for housing said batteries and said magnetic means.

9. A method for lighting or illuminating the inside of an automobile, or the like, with a portable dual auxiliary lighting means having a main case defining a recess and a pair of light housing, said pair of light housing each having a light bulb, the method comprising the steps of:

(a) locating said dual lighting means behind an interior rear view mirror of the automobile, or the like, said mirror having a support post;

(b) positioning the dual lighting means such that the recess straddles the support post;

(c) securing the positioned dual lighting means of step (b) to the mirror; and (d) activating a switch located on the main case of the lighting means to furnish illumination or lighting to the inside of the automobile, or the like, said securing step (c) comprises clamping the lighting means over the top of said rear view mirror.

* * * * *